United States Patent [19]

Beecroft

[11] 3,914,792

[45] Oct. 21, 1975

[54] FLEXIBLE PAD LOAD COUPLING

[75] Inventor: Harold James Beecroft, Minneapolis, Minn.

[73] Assignee: Control Data Corporation, Minneapolis, Minn.

[22] Filed: Nov. 25, 1974

[21] Appl. No.: 526,554

[52] U.S. Cl. .................. 360/103; 360/130; 360/104

[51] Int. Cl.$^2$......................... G11B 5/60; G11B 5/48

[58] Field of Search ............ 360/103, 102, 104, 130

[56] References Cited

UNITED STATES PATENTS

| | | | |
|---|---|---|---|
| 3,065,460 | 11/1962 | Altenau et al. | 360/103 |
| 3,124,660 | 3/1964 | Criner | 360/103 |
| 3,158,847 | 11/1964 | Pulkrabek | 360/103 |
| 3,198,889 | 8/1965 | Eulberg | 360/103 |
| 3,310,792 | 3/1967 | Groom et al | 360/103 |
| 3,702,461 | 11/1972 | Cantwell | 360/103 |
| 3,805,290 | 4/1974 | Thompson | 360/103 |

*Primary Examiner*—Alfred H. Eddleman

*Attorney, Agent, or Firm*—Edward L. Schwarz

[57] ABSTRACT

In a magnetic recording system wherein the transducing head is carried by a pad suspended adjacent the moving recording medium by a spring gimbal or other device weakly restraining pad motion with respect to the head arm parallel to the recording surface, and a cantilever spring arm loading the pad so as to force it to the proper flying height from the recording medium, apparatus for preventing the pad from being shifted parallel to the recording surface because of friction between the pad and the spring arm as the pad rides up and down on deviations from the position of the moving recording medium immediately beneath the head. The apparatus comprises a rotatably attached intermediate arm carrying a thin resilient strip, said strip being interposed on edge between the cantilevered spring arm and the pad. As the pad moves up and down, deflecting the spring, the strip twists and isolates the pad from the forces parallel to the recording surface and along the spring arm, generated by the spring arm.

5 Claims, 6 Drawing Figures

FLEXIBLE PAD LOAD COUPLING

BACKGROUND OF THE INVENTION

1. Field of the Invention

In data recording devices of the type having a magnetic recording disc moving with respect to a head pad supporting a transducing head, an improvement in the apparatus which supports the head in the proper transducing location with respect to the recording disc.

2. Description of the Prior Art

U.S. Pat. No. 3,310,792 (Groom et al) discloses a typical head support arm employing a type of head gimbal ideally suited for use with this invention. By appropriately modifying the arm, this invention may be used as a replacement for the head actuating device described therein.

BRIEF DESCRIPTION OF THE INVENTION

In such a mounting as that disclosed in Groom et al, the head and the pad carrying it are only weakly constrained from radial motion in the lateral direction, i.e., parallel to the recording surface because of the inherent thinness and flexibility of the gimbal spring or other type of mounting employed. Force must be used to counteract the hydrodynamic lift acting between the pad's flying surface and the recording surface which tends to cause the head to fly too far from the recording surface for high density recording techniques. It is preferred that a cantilevered spring arm, such as a straight arm extension of a coil spring, apply this head loading force. A cantilevered spring arm is preferred to, say, a compression spring located directly above the pad because closer packing of the discs forming the recording medium is possible. However, such a straight arm extension of a coil spring is essentially pivoted about the spring axis. Hence, as the pad moves up and down along a line approximately normal to the flying surface of the pad because of deviations in the position of the disc surface directly beneath the pad, the friction between the pad and the arm when directly coupled imposes large lateral forces on the pad, even though the pad is shifted perpendicularly but a few thousandths of an inch. Such motion causes the spring arm, when directly coupled to the pad, to frictionally shift the pad and head position radially with respect to the disc. Although the radial motion of the head can be measured in ten thousandths of an inch, nevertheless, when tracks on the recording medium are spaced at 0.005 inch or less, such shifting will frequently result in loss of registration of the head with respect to the track.

To solve these various problems, this invention employs a movable member interposed between the spring arm and the pad load point which deflects with lateral translation of the spring contact point and isolates the pad from the translation of the arm end. The invention comprises an intermediate arm, preferably pivoted about the axis on which the coil spring of which the spring load arm forms a part, is also pivoted. The intermediate arm is pierced by an opening at least partly surrounding the pad load point when placed adjacent thereto. A resilient strip contacting the pad load point on its edge adjacent the head pad back and the spring arm on its other edge, is fixed across the opening. The strip then transmits the spring load arm force to the pad load point. In operation, as the pad moves up and down, the intermediate arm pivots about the shaft and the strip flexes slightly in torsion and isolates the pad from the radial translation of the arm's contact point.

Accordingly, one purpose of this invention is to allow accurate registration of the magnetic head with the data track in which data transducing is intended.

A second purpose is to provide a simple means for unloading the spring arm from the pad.

DESCRIPTION OF THE PREFERRED EMBODIMENTS

Figures 1, 2, 3:
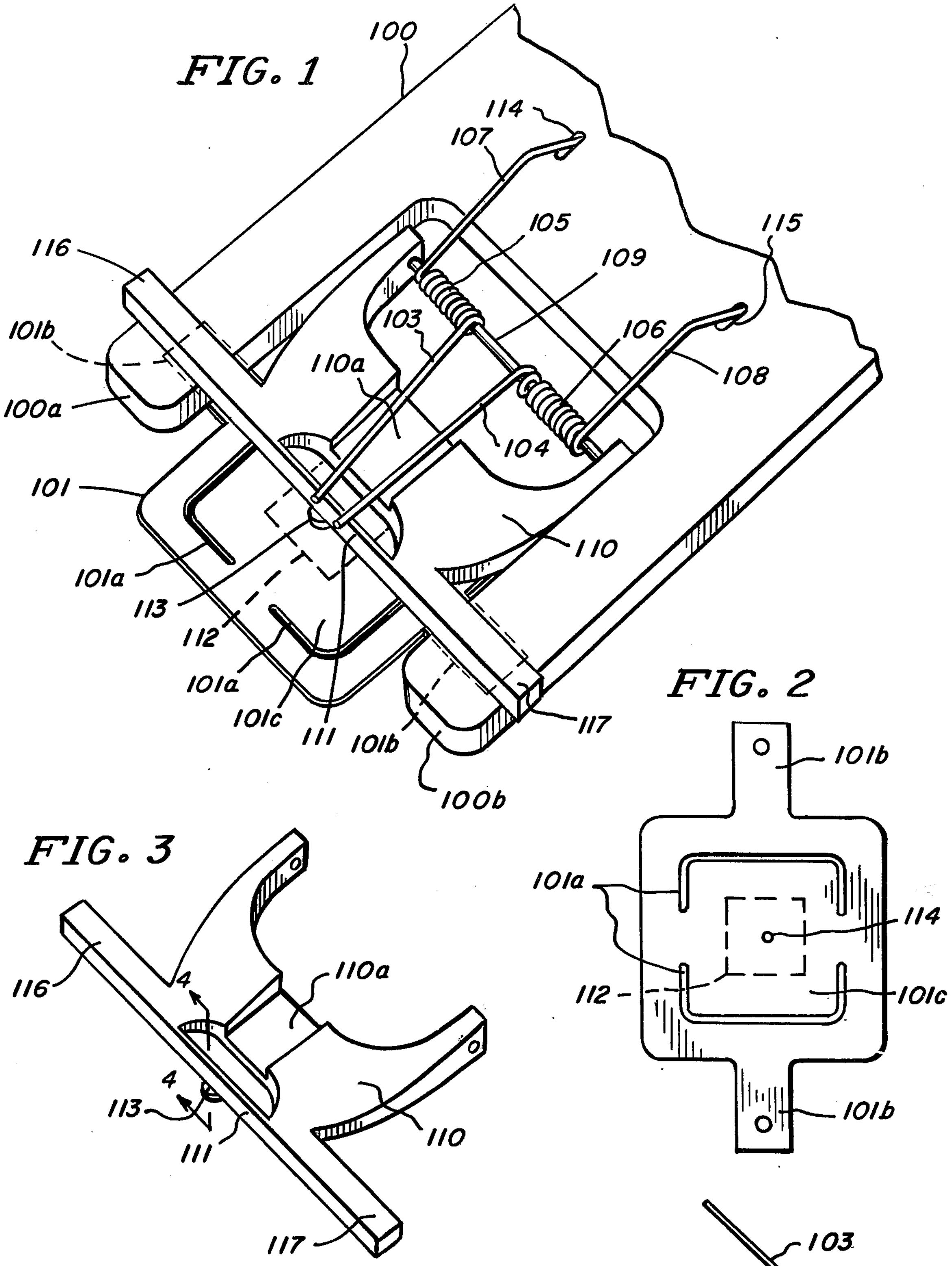
FIG. 1 is a perspective view of an assembled arm employing this invention.
FIG. 2 is a projective view of the gimbal spring which supports the transducing head.
FIG. 3 is a view of the intermediate arm carrying the resilient strip interposed between the load spring and the head.

Turning first to FIG. 1, the free end of head arm 100 is shown having a generally U-shaped opening within which the transducing head and the elements which support it are located. The position of the pad carrying the transducing head itself is indicated by outline 112 and is beneath gimbal spring 101. The flying surface of the pad faces away from spring 101. Gimbal spring 101 is attached to the two projecting ends 100*a* and 100*b* of arm 100 by its tabs 101*b* which are fixed to the projecting ends of arm 100 by machine screws, not shown. Gimbal spring 101 is shown alone in plan view in FIG. 2. C-shaped cutouts 101*a* permit interior portion 101*c* and the pad to rotate about an axis passing horizontally (FIG. 2) through the center of the spring between the two C-shaped cutouts 101*a*. The pad can also gimbal about a vertical axis by deflection of the gimbal spring material adjacent and comprising tabs 101*b*. The hydrodynamic lift force created by motion of the recording disc adjacent the pad is counteracted by springs 105 and 106 acting on intermediate arm 110. Shaft 109 supports both springs 105 and 106 and intermediate arm 110. Arm 110 can rotate on shaft 109, its downward travel being interrupted by tabs 116 and 117 contacting arm projections 100*a* and 100*b*. Spring arms 103 and 104 press against resilient strip 111, and the reactive force generated thereby is passed through the coils of springs 105 and 106 and arms 107 and 108 to depressions 114 and 115.

Figure 5:
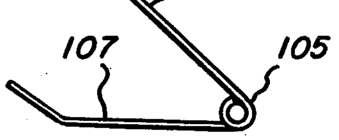
FIG. 5 is an axial view of the load spring.

Preferably, arm 110 is made from a material having substantial flexibility in thin sections, and if so may conveniently be intergral with strip 111, as shown. Load button 113 is attached to and preferrably integral with strip 111 and conducts the force of spring arms 103 and 104 to the proper load point on gimbal spring 101 (shown as point 114 in FIG. 2) for correct attitude of the pad with respect to the recording surface. Load point 114 can conveniently be a dimple or depression into which load button 113 fits. The amount of force which arms 103 and 104 exert on strip 111 is chosen to provide the proper flying height for the head. FIG. 5 shows spring 105 in its relaxed condition in an axial view, although the preload requirements of course vary according to the application.

Figure 4A:
FIGS. 4*a* and 4*b* are cross section views of the resilient strip in unflexed and exaggeratedly flexed states, respectively.
Figure 4B:
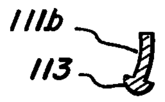

During data-transducing the pad is forced upwards by the hydrodynamic lift between its flying surface and the moving disc surface beneath it so that tabs 116 and 117 are lifted clear of arms 100*a* and 100*b*. Unavoidable deviations in the position of the recording surface beneath the head and generally parallel to the plane of gimbal spring 101 causes the pad to translate along a line approximately perpendicular to the recording surface and the flying surface of the pad. This, of course, causes intermediate arm 110 to rotate about shaft 109 slightly and springs 105 and 106 to flex torsionally. Because the pad is constrained to straight line motion because of the characteristics of gimbal spring 101, and because intermediate arm 110 and spring arms 103 and 104 are all pivotably attached to shaft 109, the arc-shaped path of load button 113 will not coincide with the path of load point 114. If spring arms 103 and 104 directly contacted load point 114, the deviation from straight line in the motion of their ends would place lateral forces on gimbal spring 101, causing it to distort and pull the head radially (with respect to the disc) from precisely straight line motion normal to the pad flying surface and the recording disc. However, resilient strip 111 deflects torsionally and accommodates the arc-shaped motion of the ends of arms 103 and 104 to the straight line motion of load point 114. FIG. 4*a* shows a cross-sectional view of the center of resilient strip 111 when strip 111 is in its unflexed or relaxed position. FIG. 4*b* is a similar cross-section which shows in exaggerated fashion the torsional distortion which center of strip 111 undergoes when the pad is at its maximum deviation from nominal. Since strip 111 deflects very easily, only small lateral forces are applied to gimbal spring 101 to distort it and move the head from its correct position. For example, if the recording surface undergoes a maximum deviation of 0.015 inch from the nominal, and the distance from shaft 109 to load button 113 is 0.3 inch, use of this apparatus prevents the lateral error of approximately 300 microinches from occuring. Since data tracks are often packed at densities upward of 200 per inch, it can be seen that the error avoided is extremely significant. If this error were present, it would, in effect, comprise nearly the total tolerance of 400 microinches in head position typically permitted.

An additional feature of this design allows spring 105/106 pressure on load point 114 to be easily relieved. Tabs 116 and 117 can be seen to extend past the outer edges of arms 100*a* and 100*b*. A means for lifting intermediate arm 110, such as a cam or lever struck by these ends of tabs 116 and 117 when arm 100 is retracted, can lift arm 110, permitting the head to be separated from the recording surface. This is important because it prevents the pad from striking the edge of the disc when arm 100 is retracted and hydrodynamic lift disappears at the edge of the disc.

Many variations on this basic apparatus are possible. Resilient strip 111 is shown as integral with intermediate arm 110, but this need not be. Strip 111, if separate, can be attached to intermediate arm 110 in any convenient fashion. The pad may be suspended by other means than the gimbal spring shown. The angular position of arms 107 and 108 may be changed by providing spacers between them and arm 100, or by a succession of steps for each to rest on, to change force on strip 111. Load button 113 may be permanently attached to gimbal spring 110 in some manner which then provides positive retraction for the pad when arm 110 is lifted.

Having thus described the invention, what is desired to be secured by Letters patent is:

I claim:

1. In data transcribing apparatus comprising a head pad carrying a transducing head and having a load point opposite its flying surface at which force counteracting hydrodynamic lift is applied, a pad support arm, a pad mounting element attaching the pad to the support arm and weakly restricting the head to motion along a preselected straight line approximately normal to the flying surface, and a spring loaded head loading arm rotatably attached to the support arm and extending adjacent the load point, improved apparatus for transferring the head loading arm force to the load point without application of force to the head causing deviation from said straight line head motion, comprising an intermediate arm rotatably attached to the support arm and a resilient strip interposed on edge between the head loading arm and the load point and attached at its ends to the intermediate arm, the middle portion of the strip deflecting torsionally with respect to its ends as the head translates along said straight line.

2. The apparatus of claim 1, wherein the intermediate arm is rotatably attached to the support at the head loading arm axis of rotation.

3. The apparatus of claim 1, wherein the middle portion of the strip includes a projection extending toward the load point and conducting head loading arm force thereto.

4. The apparatus of claim 1, wherein the central portion of the strip is spaced apart from the intermediate arm.

5. The apparatus of claim 1, wherein the strip is integral with the intermediate arm.

* * * * *